Figures 1, 2, 3:
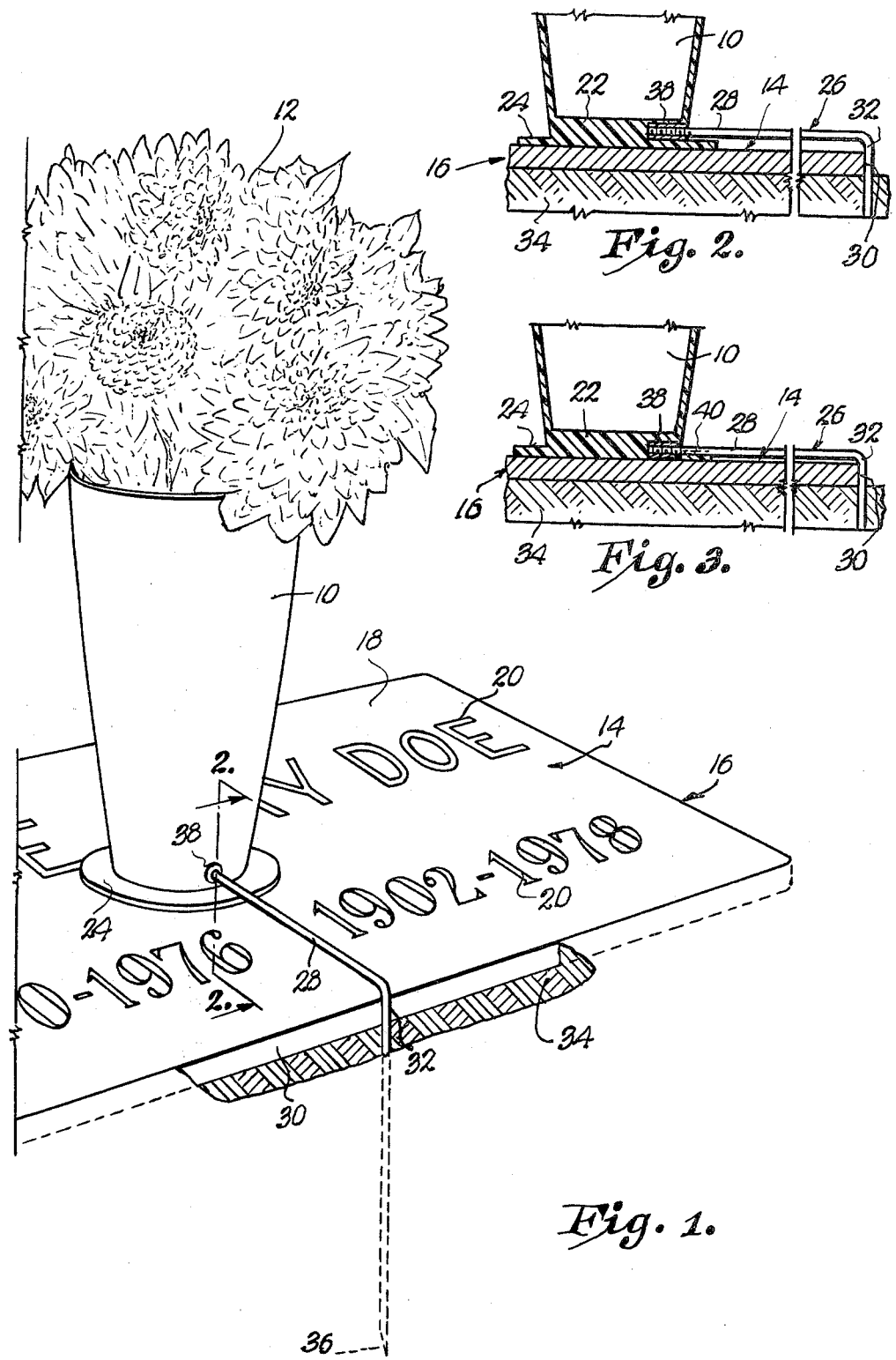

United States Patent [19]

Cooper

[11] 4,217,729
[45] Aug. 19, 1980

[54] FLOWER CUP FOR GRAVE MARKER

[76] Inventor: Albert D. Cooper, 3601 W. 98 St., Overland Park, Kans. 66206

[21] Appl. No.: 959,685

[22] Filed: Nov. 13, 1978

[51] Int. Cl.³ .............................................. A01G 5/04
[52] U.S. Cl. .................................................. 47/41 G
[58] Field of Search ...................... 47/39, 40, 41, 41.1, 47/41.11, 41.12, 41.13, 41.2; 248/27.8

[56] References Cited

U.S. PATENT DOCUMENTS

| 1,977,417 | 10/1934 | Winger | 47/41 |
| 2,140,862 | 12/1938 | Sumner | 47/41.2 |
| 2,399,498 | 4/1946 | Messick | 47/39 X |
| 2,733,549 | 2/1956 | Moore | 47/41 |
| 2,734,312 | 2/1956 | Vaghi | 47/41 |
| 2,789,397 | 4/1957 | Tritsch et al. | 47/41.2 |
| 2,906,061 | 9/1959 | Carlson | 47/41 |
| 3,065,947 | 11/1962 | Thompson | 248/361 |
| 3,136,510 | 6/1964 | Bowers et al. | 248/27.8 |

Primary Examiner—Edgar S. Burr
Assistant Examiner—James R. Feyrer
Attorney, Agent, or Firm—Schmidt, Johnson, Hovey & Williams

[57] ABSTRACT

A flower pot has a retainer which holds the pot atop a flat, ground-level grave marker in position where neither the pot nor its retainer is interfered with by lawn mowers cutting grass closely adjacent and around the marker. The retainer is L-shaped, presenting a vertical leg that penetrates the ground adjacent one edge of the marker and a horizontal leg closely overlying the marker and extending radially into the bottom of the pot where it is releasably attached to the pot.

1 Claim, 3 Drawing Figures

U.S. Patent

Aug. 19, 1980

4,217,729

FLOWER CUP FOR GRAVE MARKER

It is commonplace in modern-day cemeteries to eliminate headstones and the like in favor of relatively small, plaque-like tablets having indicia thereon relating to the name of the deceased and other information. This plaque facilitates maintenance of the grounds, yet there continues to exist the problem of interfering flower pots or cups. Conventional flower-receiving holders associated with such markers are usually knocked over or damaged by lawn mowers and other maintenance equipment. No convenient means of attachment of the holders is provided on the markers such as to permit maintaining the holders in a proper position, yet out of the way of the lawn mowers when grass is to be cut closely adjacent and around the marker itself.

In accordance with my present invention, a retainer is provided with a ground-penetrating leg that, in turn, has a horizontal extension over the upper face of the marker and releasably attached to the pot, positioning the latter where the indicia on the marker remains unobstructed, both the retainer and the pot being out of the way such as to not interfere with the grass-mowing operation around the marker.

In the drawing, FIG. 1 is a fragmentary perspective view of a flower cup for a grave marker, all parts being illustrated in the normal position.

FIG. 2 is a fragmentary cross-sectional view showing one embodiment of the relationship of the retainer to the out-turned flange of the pot; and FIG. 3 is a view similar to FIG. 2 showing a slightly different form or arrangement of the retainer to the pot.

A pot 10 for flowers 12 is in the nature of an upright, hollow, open-top vessel adapted to sit at approximately a medial location on a normally uppermost, flat face 14 of a plaque-like, relatively thin, grave marking tablet 16 such as to leave a margin 18 on the face 14 surrounding the pot 10, leaving unobstructed from view a certain commemorative or identifying inscription 20 on the face 14. The pot 10 has a round bottom 22 and an out-turned, circular supporting flange 24 integral with and surrounding the bottom 22 rests flatly on the face 14.

A rod-like retainer 26 which releasably maintains the pot 10 in the position shown in FIG. 1, is L-shaped, presenting an elongated, horizontal leg 28 having a relatively small cross-sectional area, and lying rather close to the face 14 as seen in FIG. 2 so as not to interfere with lawn mowers cutting grass around the tablet 16.

The leg 28 is radial to the bottom 22 and extends therefrom in engagement with the flange 24 and across the face 14 toward one outer edge 30 of the tablet 16, where it joins integrally with a vertical leg 32 which penetrates the ground 34 closely adjacent the edge 30 and having a lower sharpened end 36 for ease of driving into the ground 34.

A radial tube 38 provided with internal screw threads extends into and is tightly fitted within the bottom 22 adjacent to flange 24. The leg 28 has a tapped length remote from the leg 32 which extends into the tube 38 in mesh with the threads of the latter, rendering the retainer 26 removable from the pot 10.

In order to place the leg 28 still closer to the face 14, a groove 40 may be provided in the flange 24 for receiving the leg 28 as seen in FIG. 3.

I am aware of the disclosures of the following U.S. Pat. Nos.:

| | | |
|---|---|---|
| 1,977,417 | W. C. Winger | October, 16, 1934 |
| 2,733,549 | C. M. Moore, Jr. | February 7, 1956 |
| 2,734,312 | J. Vaghi | February 14, 1956 |
| 2,906,061 | E. C. Carlson | September 29, 1959 |
| 3,065,947 | J. R. Thompson | November 27, 1962 |

If the ground-piercing elements of the flower vase of Winger, U.S. Pat. No. 1,977,417, were used in connection with a grave-marker adjacent one of its edges, the vase would clearly obstruct lawn-mowing operation and be readily damaged if the operator attempted to cut the grass cleanly in and around the marker.

The same deficiencies are evident in Carlson, U.S. Pat. No. 2,906,061, and in Thompson, U.S. Pat. No. 3,065,947.

If effort were made to utilize the devices shown by Moore, U.S. Pat. No. 2,733,549, or Vaghi, U.S. Pat. No. 2,734,312, it would be necessary to cut a hole in the center of the marker.

Accordingly, none of these prior art references even remotely suggest the novel features of my present invention.

I claim:

1. A flower cup for mounting on a plaque-like grave marker normally having a generally flat upper face and disposed with such face substantially at ground level, said flower cup comprising:

an upright, hollow, open top, flower- and water-receiving vessel having a solid, disc-like bottom section and a sidewall integral therewith;

an out-turned supporting flange surrounding said bottom section, integral therewith and projecting outwardly beyond the bottom peripheral edge portion of the sidewall of the vessel;

an L-shaped rod of a circular section for anchoring said vessel in the ground, said rod presenting an elongated vertical leg with the lower end thereof pointed to facilitate insertion into the ground, and a horizontal leg with one end integral with the upper end of said vertical leg, screw threads at the opposite end thereof, and a length greater than the horizontal diameter of said flange; and means for removably mounting said rod to said bottom section, said means including a tube extending radially inwardly into and tightly fitted within said bottom section and being provided with internal screw threads for cooperative engagement with the screw threads on said horizontal leg, such that when said rod is in engagement with said vessel, said vessel is offset from the vertical leg of said rod, and said horizontal leg lies below the upper surface of said bottom section, so as to be closely adjacent the upper surface of the marker.

* * * * *